United States Patent Office 2,913,573
Patented Nov. 17, 1959

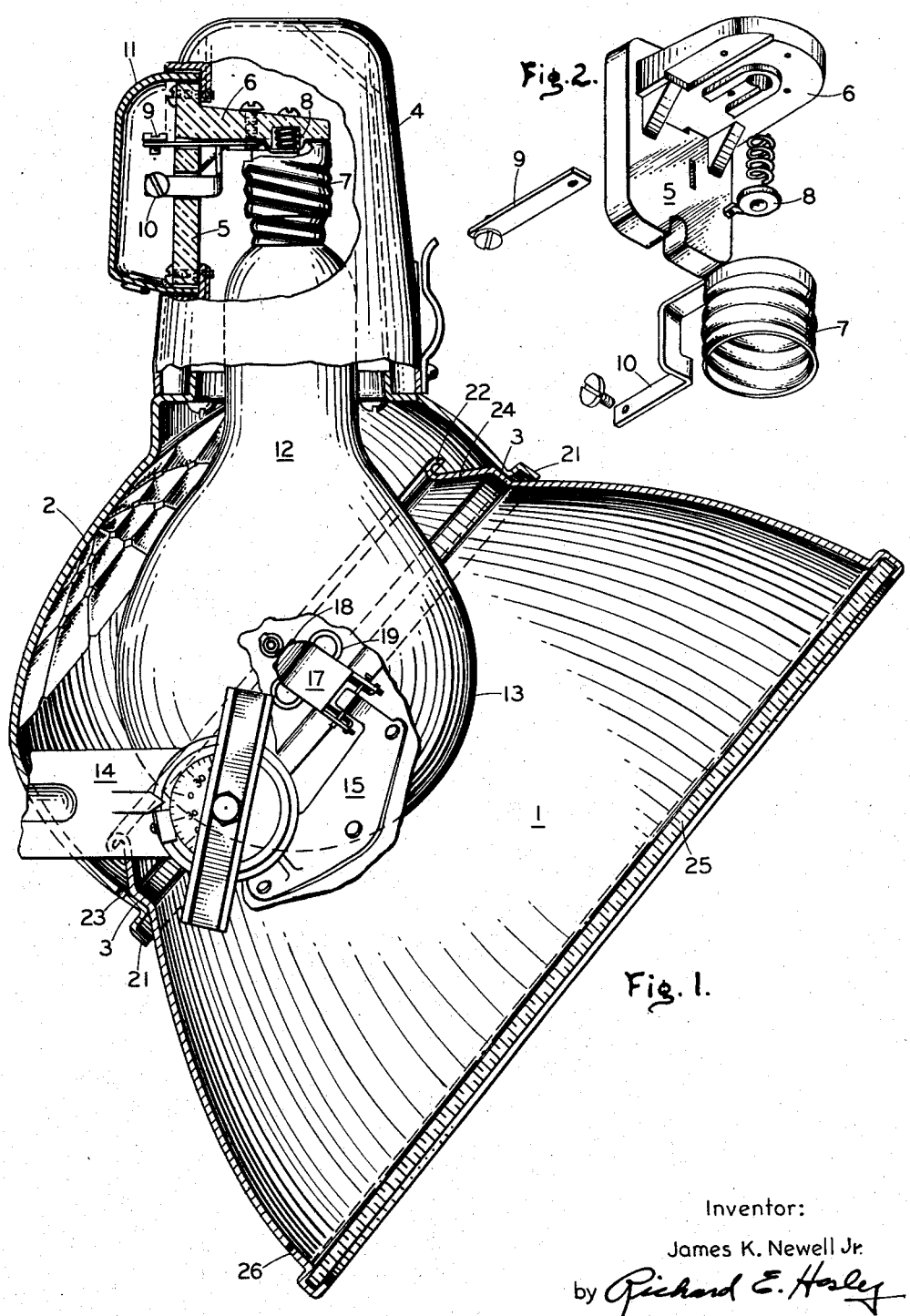

2,913,573

LIGHT PROJECTOR

James Kirk Newell, Jr., Hendersonville, N.C., assignor to General Electric Company, a corporation of New York Application May 8, 1957, Serial No. 657,881

2 Claims. (Cl. 240—41)

This invention pertains to lighting fixtures and, in particular, to improved outside mounted light projectors having a unique rainproof construction.

In many cases floodlights and other lighting projectors which are exposed to the elements require a weatherproof enclosure of some sort to prevent the entrance of rain and for this purpose gasketed structures are often used. A well-made gasketed lighting fixture depends for its effectiveness in preventing the entrance of water upon the precision of its parts and upon the resistance of the gasket itself to cumulative aging effects such as embrittlement and rotting. Furthermore, an enclosed floodlight may generate a considerable amount of heat in operation, and although a gasketed assembly is generally more expensive than an ungasketed one, the employment of gasket materials necessarily capable of resisting high temperatures adds further to the cost of the light projector.

This invention has as one of its objects to provide an improved light projector for exterior mounting which avoids the effects of moisture penetration without the necessity of employing a gasket. The invention has as another of its objects to provide an improved light projector having a reflector formed in easily separable parts permitting easy access to the interior of the light projector, the reflector parts being so formed as to impede the entrance of moisture into the fixture and to drain from the fixture any moisture which should enter before damage can be done to the projector or to a lamp positioned therein.

By way of a brief summary of a single embodiment of this invention, I provide a light projector with a combination reflector which is separable into front and rear parts at a joint between the parts. Releasable clamps on the exterior of the projector hold the front and rear portions together and a socket structure is so arranged that when a lamp is inserted therein, the larger part of the lamp envelope is suspended in the region surrounded by the joint between reflector parts. Ordinarily, the light projector is supported with the reflector axis downwardly pointing for directing a beam of light onto a surface, normally horizontal, to be illuminated. The reflector sections are so constructed and arranged relative to each other as to form a close fit at their common joint, the front section telescoping within the rear section. An angular lip on the rear part of the reflector overlies the outside of the front part of the reflector on one side of the joint between parts, and a drainage hole is provided immediately on the other side of the joint in the rear reflector portion so located that it occupies a bottom position. The front part of the reflector is provided with a trough-like flange which extends into the rear part of the reflector on the inner side of the close-fitting joint forming a baffle or dam which collects any water which enters through the joint, draining it around the position occupied by the body of the lamp and toward the drainage hole in the bottom of the rear reflector. Although the instant invention is not to be limited except by a fair interpretation of the appended claims, the details of the invention itself, as well as additional objects and advantages thereof, may be better understood in connection with the following description taken together with the accompanying drawings wherein:

Figure 1 is a drawing, principally in section, of a light projector constructed in accordance with the present invention; and Figure 2 is an exploded view of certain details of the lamp socket and supporting structure.

The illustrated light projector embodying the essential concepts of this invention is shown to comprise a combination reflector formed in two sections, a front part 1 and a rear part 2 which telescope together at a joint 3 forming a close fit between parts. Means are provided for supporting a lamp within the projector comprising a housing 4, generally in the shape of an inverted cup for purposes of waterproofing, to which is fastened a socket supporting arrangement of porcelain or other suitable insulating material including a base 5 and a bracket 6 extending therefrom. Dependent from the bracket a screw shell socket 7 is supported surrounding a center contact 8. Conducting buses 9 and 10 extend from the socket 7 and center contact 8 through the base member 5 to a position outside of the housing at which electrical connections may be made. This construction has the advantage of placing the electrical cables which are to be attached to the unit wholly outside of the space occupied by the lamp in a volume wherein ambient temperatures are considerably reduced. In a typical fixture of this general type temperatures in the vicinity of the lamp socket may rise as high as 200° centigrade, which may result in rapid deterioration of the electrical insulation on a cable in this space. A terminal base or cover 11 is provided to protect the buses 9 from excess moisture. A lamp 12 suspended from the above-described supporting means will be so positioned that its body portion 13, comprising in this instance the major part of its envelope, will be situated within the reflector and opposite the joint 3 between the parts.

The light projector shown is supported by a positioning device including a trunnion bracket 14 and pivotal bracket 15 so that the optical axis of the projector may be trained in any direction within an operating quadrant extending from 0° to 90° below the horizontal. The reflecting surface of the projector is therefore generally downwardly pointed for directing a beam of light onto a surface, usually horizontal, to be illuminated. The positioning device for orienting the light projector within its operating quadrant forms no part of the present invention but as shown is of the type described and claimed in Patent No. 2,241,059, issued on May 6, 1941, to J. P. Foulds and assigned to the same assignee as that of the present invention. Separable fastening means are provided on opposite sides of the projector for securing the front and rear sections of the reflector together comprising, in a preferred form, a toggle latch 17 for actuating a latch hook 18 which in turn cooperates with a spring member 19 for releasably securing both parts together. The mode of construction of the reflector parts lends itself to ease of manufacture because of the relatively uncomplicated methods which may be used to form the two reflector sections. Furthermore, easy access is had to the interior of the light projector for polishing the reflecting surfaces and for replacing burned-out lamps.

In order to inhibit the passage of water from the outside to the interior of the light projector, an overhanging lip portion 21 is formed on the rear reflector section 2 extending beyond and protecting the joint 3 from the entrance of moisture. Even in a very high wind this construction considerably reduces the velocity of any water which may be blown into the projector. Should water be driven under the lip portion 21 and through the adjacent joint 3, a means is provided for collecting this water and directing it in a circuitous path to a point where it is discharged from the interior of the projector. Water not so collected and drained would have the obvious deleterious effect of dulling the specular surfaces of the reflector combination and, if allowed to drip upon the hot envelope of a lamp suspended within the projector, could cause breakage of the lamp, necessitating frequent servicing operations on the projector. As shown the means for redirecting the water may comprise a trough-like flange or baffle 22 formed on that part of the front reflector section which telescopes into the rear reflector section. Any water entering the fixture through the joint 3 will be directed by this flange in avoidance of the active specular surfaces of the reflector in a path about the body portion of the lamp to a point at the bottom of the joint where a hole 23 forming a drainage channel passes the moisture again to the outside of the light projector. In forming the flange 22 to trap moisture which enters between reflector sections, it is not necessary to neglect the use of that portion 24 of the front reflector section which supports the flange. Portion 24 may be given the same type of specular surface, preferably parabolic in section, that the other portions of the reflector are given. The drainage channel need not constitute an actual hole as shown but could be formed instead by relieving the close fit at the bottom of the joint to permit the passage of water through the joint itself. I have preferred to show the downwardly directed mouth portion of the light projector closed by a coverglass 25 sealed into the reflector structure. At the very bottom of the front reflector section there may be provided an additional moisture relief channel 26 to drain off condensed moisture which may form on the interior surface of the front reflector.

By this construction it can be seen that I have provided an improved light projector which, although it is readily separable into separate parts providing easy access to the interior thereof, is so formed that it impedes the entrance of moisture into the fixture and drains any entrapped moisture from the fixture if it should enter without harm either to the reflector or to a lamp suspended therein. This has been accomplished without the necessity of a gasketed assembly and results in a light projector having an inherently long useful life without the necessity of replacing parts which may lose their effectiveness through aging.

Although I have illustrated but a single embodiment of this invention, certain modifications within the scope of the appended claims will naturally occur to those skilled in the art to which this invention pertains.

What I claim as new and desire to secure by Letters Patent of the United States is:

1. A light projector having a reflector separable into front and rear parts at a section at right angles to its axis; means for supporting a lamp in said projector with its body portion located within said reflector at said section; separable fastening means for holding said two parts of said reflector in assembled relationship; and means for supporting said reflector with its axis at an angle to the vertical and with its reflecting surface pointed downwardly for directing a beam of light onto a surface to be illuminated, said two parts of said reflector having a close fit with one another along telescoping surface portions thereof, said rear part of said reflector having an angular lip overlying the outside of said front part of said reflector on one side of said close fit between said parts and a drainage channel in its bottom portion on the other side of said close fit, and said front part of said reflector having a trough-shaped flange extending into said rear part of said reflector from said other side of said close fit between said parts forming a dam to collect and direct to said drainage channel and away from a lamp held in said lamp supporting means any water that passes through said close fit between said parts of said reflector.

2. A light projector having a reflector separable into front and rear parts at a joint between them, said reflector having a drainage channel in the bottom of its wall structure at said joint for draining water from said projector; means for supporting a lamp in said projector with its body portion within said reflector and opposite the joint between said parts; fastening means for holding said two parts of said reflector in assembled relationship; and means for supporting said reflector with its reflecting surface pointed downwardly for directing a beam of light on to a surface to be illuminated, said two parts of said reflector having a close fit with one another, said rear part of said reflector having a lip overlying the outside of said front part of said reflector on one side of said joint, and said front part of said reflector having a trough-shaped flange extending into said rear part of said reflector from said other side of said joint forming a dam to collect and direct any water that passes through said joint between said parts of said reflector away from a lamp held by said supporting means and toward said drainage channel.

References Cited in the file of this patent

UNITED STATES PATENTS

| | | |
|---|---|---|
| 1,473,400 | Dunn | Nov. 6, 1923 |
| 1,650,719 | McGinnis | Nov. 29, 1927 |
| 2,618,738 | Foulds | Nov. 18, 1952 |